A. M. LARROWE.
DEVICE FOR PREVENTING HENS FROM SETTING.
APPLICATION FILED JUNE 2, 1917.
1,234,778.
Patented July 31, 1917.
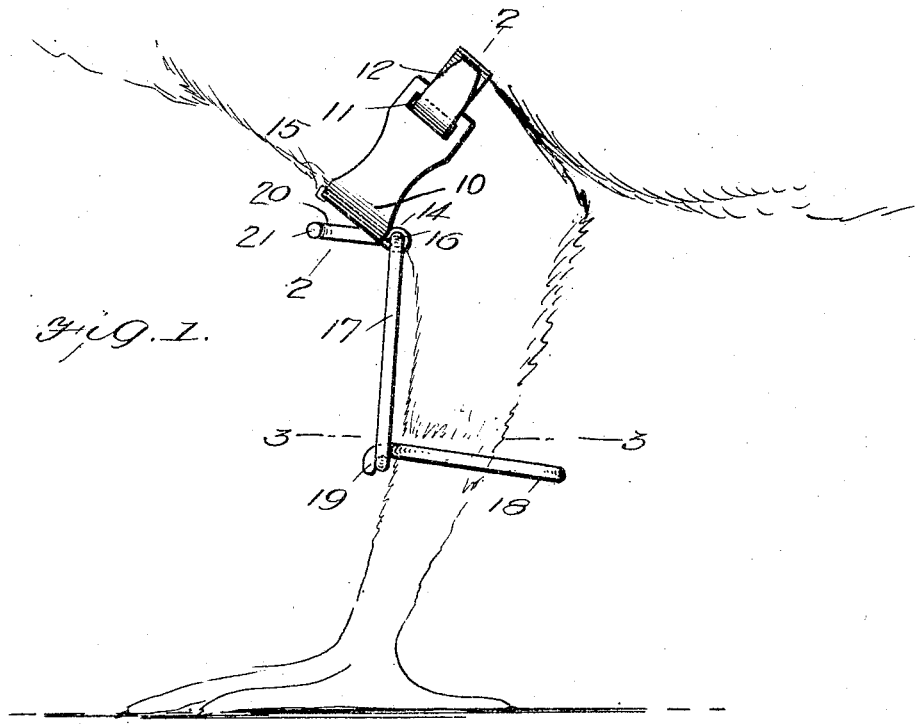
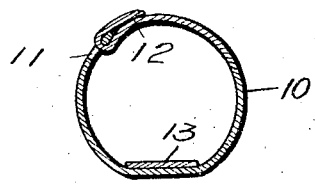
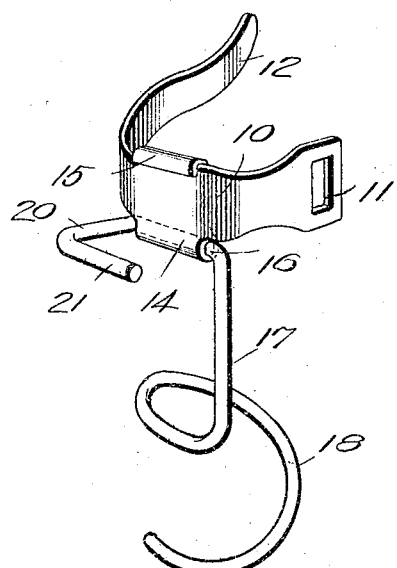
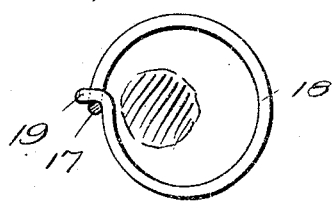
WITNESSES
INVENTOR
Arthur M. Larrowe
BY
ATTORNEYS

UNITED STATES PATENT OFFICE.

ARTHUR M. LARROWE, OF CANISTEO, NEW YORK.

DEVICE FOR PREVENTING HENS FROM SETTING.

1,234,778. Specification of Letters Patent. Patented July 31, 1917.

Application filed June 2, 1917. Serial No. 172,382.

*To all whom it may concern:*

Be it known that I, ARTHUR M. LARROWE, a citizen of the United States, and a resident of Canisteo, in the county of Steuben and State of New York, have made certain new and useful Improvements in Devices for Preventing Hens from Setting, of which the following is a specification.

My present invention relates to devices for preventing hens from setting, and is particularly designed to provide a humane arrangement of this type which will permit of free use of its limbs by the bird to which the device is attached, under ordinary circumstances, and which will at the same time effectively operate to prevent the bird from setting.

My invention as thus outlined resides particularly in the construction, arrangement and operation of the parts to be now described with respect to the accompanying drawings, forming part of this specification and in which—

Figure 1 is a side view illustrating a particular application of the invention.

Fig. 2 is a cross section through the upper band and taken substantially on line 2—2 of Fig. 1.

Fig. 3 is a sectional view taken substantially on line 3—3 of Fig. 1 adjacent the lower ring, and Fig. 4 is a perspective view of the device removed.

Referring now to these figures, the device as contemplated by my invention includes a band 10, adapted to snugly encircle the upper portion of the leg of the chicken above the leg joint, the band having a transversely elongated or slotted opening 11 at one end, and a slightly tapering opposite free end 12, adapted for extension through the slot 11, and for bending back thereon, as particularly seen in Figs. 1 and 2, in order to lock the same in the operative position shown in Fig. 1.

The band 10 also has at an intermediate point a laterally projecting extension 13 bent transversely of the band in such manner as to provide at an intermediate point along the lower edge of the band a longitudinally disposed tubular bearing 14, the extremity of the lateral extension 13 being bent acutely around the upper edge of the band opposite the bearing 14, in order to lock the extension in the operative position as indicated at 15 in Fig. 4.

Through the bearing 14 is extended the upper angular portion 16 of an upright stem 17, the latter being bent at its lower end to form a ring 18 projecting substantially at right angles to the axis of the stem 17, and the free end or extremity of which ring is adapted to be bent angularly over its opposite end adjacent the lower end of the stem 17, as seen at 19 in Figs. 1 and 3, in order to lock the ring in position around the lower portion of the leg of a chicken below the leg joint as shown in Fig. 1.

The ring 18 is arranged to encircle the lower portion of the chicken's leg as shown in Fig. 3 in spaced relation thereto, and being flexibly joined to the band 10, by means of the stem 17, and the upper angular portion 16 which works in the bearing 14. This structure obviously permits of free and comparatively unobstructed movements under ordinary circumstances. To prevent the hen from setting, however, the upper angular portion 16 of the stem 17 has a forwardly bent portion 20 provided with an angular extension 21 in front of the band and adapted for engagement with the latter when the joint of the leg is flexed as the chicken attempts to assume the setting position so as to form substantially a rigid brace between the ring 18 and band 10 at the forward portion of the leg and thus definitely arrest or prevent the completion of such flexing leg movement.

It will thus be understood that my invention comprises an effective, efficient device of the nature and for the purposes set forth which is at the same time humane under ordinary circumstances, and which in addition to these advantages may be manufactured at small cost and quickly and readily applied and removed as desired, it being understood that in removing the device the angularly bent extension 19 of the ring 18 is simply lifted until it can be freed and the bent extension of the band 10 is moved outwardly from the position shown in Fig. 2, until it can be pulled loose through the slotted opening 11.

I claim:

1. In a device for preventing hens from setting, the combination of a band adapted to encircle the upper portion of the leg above the leg joint and having detachably connected end portions, a ring adapted to encircle the lower portion of the leg below the leg joint, a connection between the ring and the band at the forward portion of the leg, flexibly connected to the band, and means carried by said connection for engagement with the band when the leg is flexed to form a rigid brace between the ring and the band for the purpose described.

2. A device for preventing hens from setting including a band secured snugly around the upper portion of the leg above the leg joint, an upright stem having an upper angular portion flexibly connected to the forward portion of the band, and having its lower portion bent to form a ring adapted to encircle the lower portion of the leg in spaced relation below the leg joint, said upper angular portion of said stem having a forwardly projecting portion provided with an angular extension to engage the forward portion of the band upon flexing movement of the leg joint, whereby to form a rigid brace between the ring and the band at the forward portion of the leg.

3. A device of the character described including a band having a transversely elongated slot at one end through which the opposite end of the band may be extended to detachably connect the ends thereof, said band having a dependent intermediate extension bent upwardly and transversely across the inner face thereof and forming a bearing longitudinally of the band at the lower edge thereof, the upper edge of said extension being bent acutely around the upper edge of the band to lock the extension in place, a stem depending from the forward portion of the band and having an angular upper portion projecting through the said bearing and provided with a forward angular extension, the lower end of the said stem being bent to form a ring, the free end of which is detachably engageable with the opposite end thereof adjacent the lower end of the stem to hold the ring in position.

4. A device of the character described including an upper band having detachably connected ends and a longitudinally extending bearing intermediate the same at its lower edge, a stem having an upper angular portion extending through the bearing and provided with a forward angular extension, and a ring at the lower end of the stem extending in a plane substantially at right angles to the axis of the stem.

5. A device of the character described comprising an upper leg encircling member having a bearing at its lower forward portion, a lower leg encircling member, and a connection between the said upper and lower members with which the latter is rigid, said connection having a portion movably mounted in the bearing of the upper leg encircling member and provided with an angular extension shiftable toward and away from said member.

6. A device of the character described, comprising an upper band and a lower ring, the latter having an upwardly projecting forward rod provided with a movable connection intermediate its ends with the band and an angular upper extremity engageable with the band to form a rigid brace between said band and said rings.

ARTHUR M. LARROWE.